United States Patent [19]

Keely

[11] 4,157,030

[45] Jun. 5, 1979

[54] SYSTEM FOR DERIVING FUEL CONSUMPTION OF A VEHICLE

[75] Inventor: William A. Keely, Fremont, Mich.

[73] Assignee: The Bendix Corporation, Southfield, Mich.

[21] Appl. No.: 881,476

[22] Filed: Feb. 27, 1978

[51] Int. Cl.² .......................................... G01M 15/00
[52] U.S. Cl. ....................................................... 73/113
[58] Field of Search .................................. 73/113, 114

[56] References Cited

U.S. PATENT DOCUMENTS

| | | | |
|---|---|---|---|
| 3,118,302 | 1/1964 | Fathauer | 73/114 |
| 4,002,062 | 1/1977 | Kuno et al. | 73/114 |
| 4,031,363 | 6/1977 | Freeman et al. | 73/114 |

Primary Examiner—Anthony V. Ciarlante
Attorney, Agent, or Firm—Gaylord P. Haas, Jr.; Russel C. Wells

[57] ABSTRACT

A system for indicating the miles to go for use in a motor vehicle the indication being generated in response to signals representing the fuel consumption and the fuel remaining in the vehicle, the system including a transducer for sensing the speed of the vehicle, for example in miles per hour, and a circuit for conditioning that signal to provide an output analog signal indicative of the speed of the vehicle, the output of which is fed to an analog divider circuit. The system, in the case of a fuel injected engine, also includes a circuit for sensing the fuel injection pulses, to provide an additional input to the analog divider circuit. The miles per hour signal is divided by the fuel consumption gallons per unit time circuit to provide an output signal indicative of the miles per gallon fuel consumption of the engine at the sensed operating condition. This signal is multiplied by a gallons to go signal which may be derived from the fuel remaining indicator system of the vehicle. This multiplication provides a miles to go indication which may be fed to the operator.

5 Claims, 2 Drawing Figures

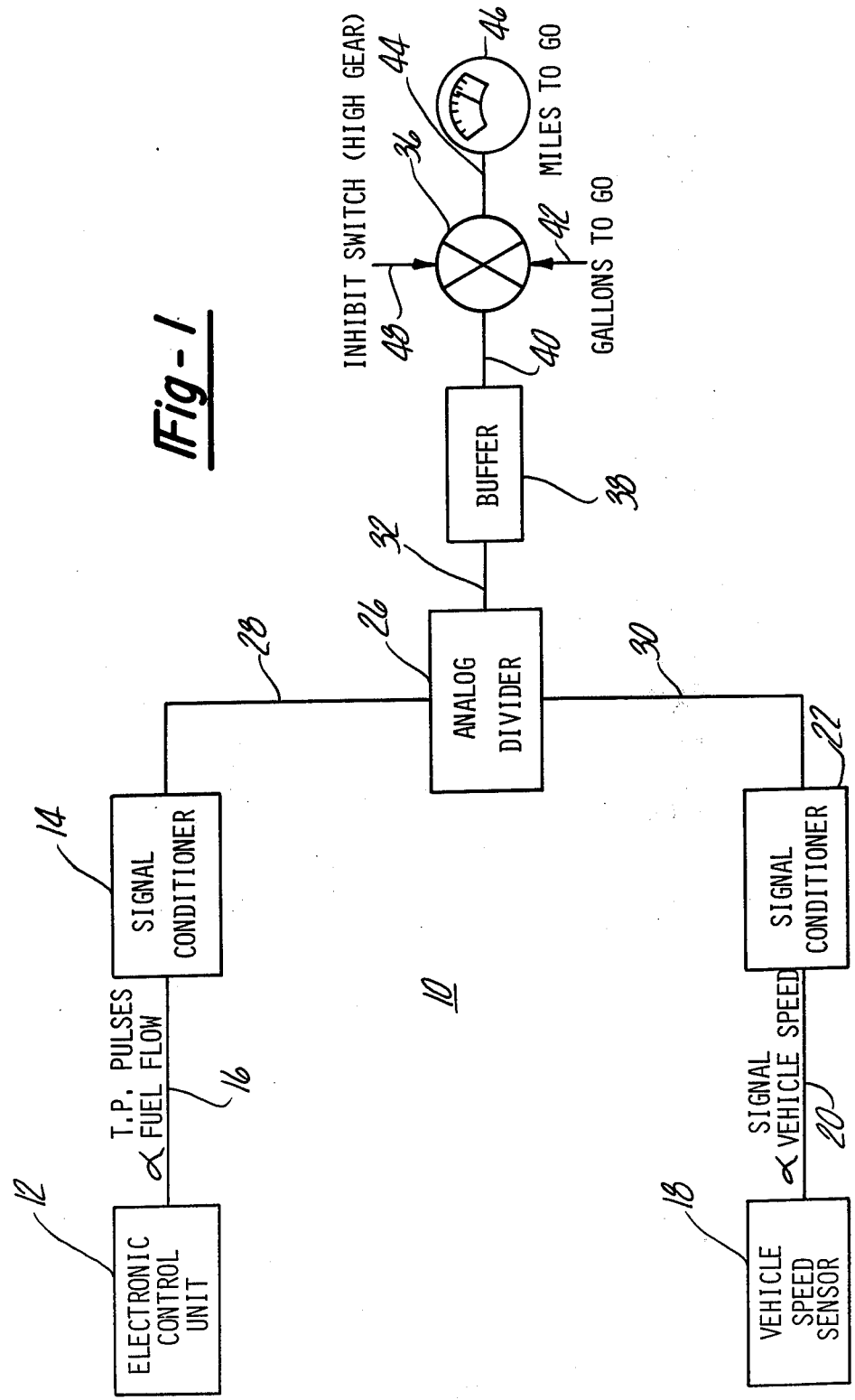

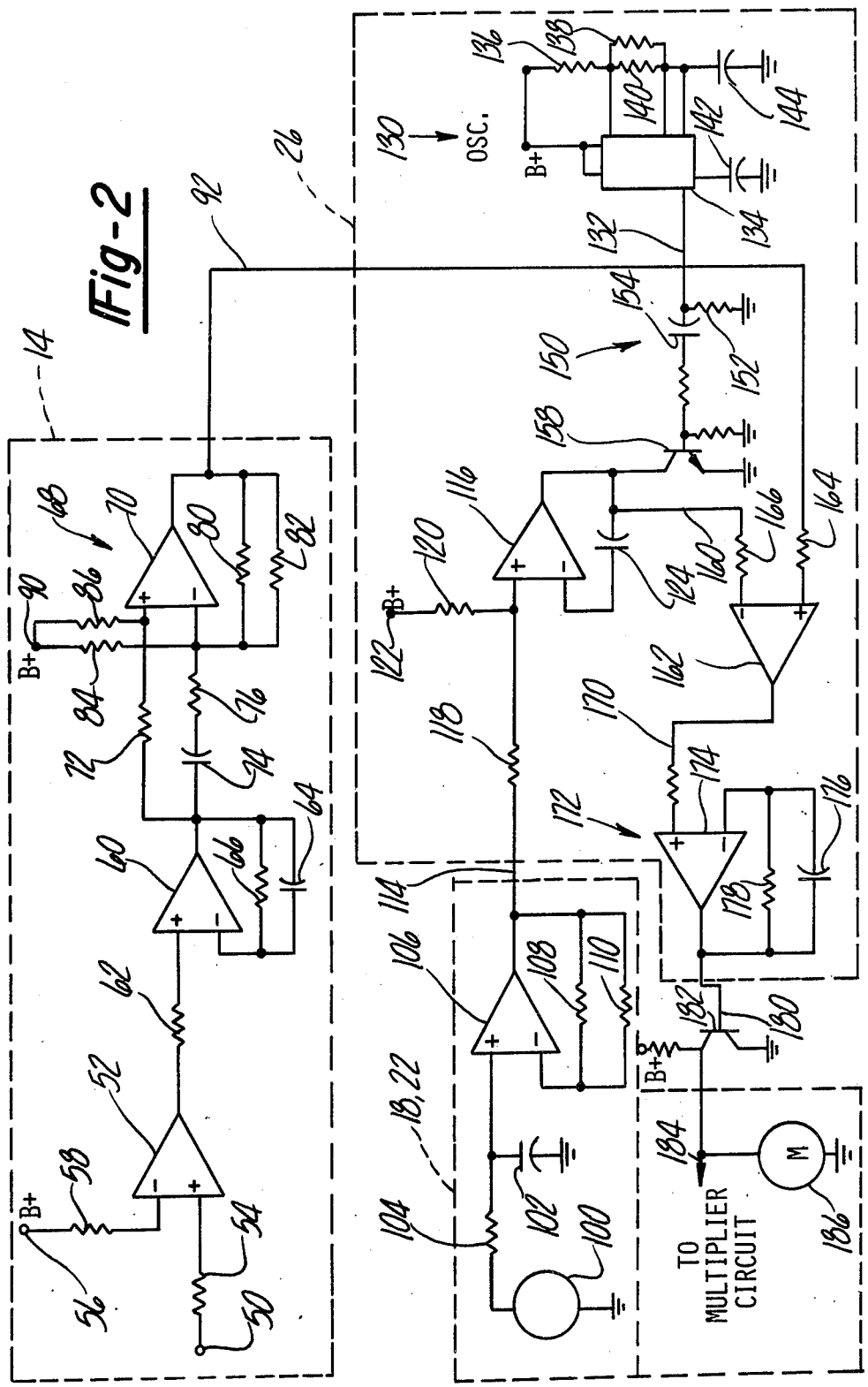

SYSTEM FOR DERIVING FUEL CONSUMPTION OF A VEHICLE

BACKGROUND AND SUMMARY OF THE INVENTION

This invention relates generally to a system for providing an indication to a vehicle operator of the miles a vehicle has the capability of traveling relative to the amount of fuel remaining for the operation of the vehicle at the time of the calculation, and more particularly, relates to a system for providing an instantaneous indication of the true miles to go for a vehicle under any operating conditions and an indication of how the true miles to go varies with variations in operating conditions of the vehicle.

In operating a motor vehicle, the situation has often arisen where the operator desired to know the number of miles which the vehicle is capable of traveling with the remaining quantity of fuel on board the vehicle. This calculation has been typically made by estimating the amount of fuel remaining in the vehicle, estimating the amount of fuel consumption for the particular speed at which the vehicle is being operated and multiplying the fuel consumption in miles per gallon by the remaining quantity of fuel on board to arrive at an estimated miles to go figure. However, at best, this figure is an estimate and could result in gross inaccuracies. Further, while the operator may vary the operating conditions of the vehile to maximize the remaining miles to go within the limits of operation of the highway on which the vehicle is being operated, the operator has no accurate measure of maximizing the miles to go.

Accordingly, if a vehicle is low on fuel and the operator knows the distance to the next fueling station, it would be desirable to operate the vehicle to provide a fuel consumption which is consistent with the conditions of the highway on which the vehicle is being operated and also to provide an operation which will insure that the vehicle will have sufficient fuel to travel to the next fueling station. Also, it would be desirable to provide a fuel consumption indication in order to facilitate the operator maximizing the fuel consumption of the vehicle irrespective of the requirement to know the miles to go capability of the vehicle for the fuel on board.

A system has previously been evolved which provides an indication to the driver of the amount of fuel being consumed by the vehicle based on either the distance traveled or the lapsed timed. In this arrangement, described in U.S. Pat. No. 3,812,710, issued May 28, 1974 and entitled "Electronic Fuel Consumption Meter," certain engine operating parameters are sensed, for example engine drive shaft speed and throttle setting, or rotational speed and the pressure in the intake manifold or the pressure in the intake manifold and the setting of the throttle valve, and are utilized to provide an electrical output that is calibrated to read fuel consumption in unit distance or fuel consumption in unit time for the travel of the vehicle.

The system described in the above described patent does not provide the operator with an output signal which is indicative of the true miles to go of the vehicle for the fuel available on board. Also, the system disclosed does not describe the particular manner in which the system of the instant invention derives a fuel consumption signal to enable the operator to maximize the fuel consumption without regard to the number of miles remaining to go for the vehicle.

The system of the present invention provides a transducer for sensing the vehicle speed which may either be in an analog or digital form. If the signal is an analog form, the signal is suitably amplified and fed to an analog divider circuit. If the signal is in digital form, the signal is conditioned through an integrator circuit and an active filter circuit which provides an analog signal representative of the vehicle speed under all vehicle operating conditions. The system also includes a sensor for providing a signal indicative of the fuel consumption of the vehicle. In the case of a fuel injected engine, this signal is easily derived by sensing the pulses being fed to the fuel injector or injectors, as the case may be, and integrating this signal by means of a signal conditioner to provide an analog signal representative of fuel consumption of the vehicle.

The vehicle speed signal is then fed to an analog divider which divides the vehicle speed signal by the fuel consumption signal to provide a fuel consumption signal calibrated in distance traveled per quantity of fuel. This signal is then fed to a multiplier circuit through a buffer, the multiplier circuit including an input from a quantity of fuel sensor which provides an indication of the remaining quantity of fuel on board the vehicle. The output of the buffer is multiplied by the quantity of fuel remaining signal which then provides an output signal representative of the remaining miles to go capability of the vehicle. The system also includes an inhibit switch to provide the output signal only during high gear operation of the vehicle to insure that spurious signals are not generated during rapid acceleration or deceleration situations, which signals would not be useful to the operator.

OBJECTS AND BRIEF DESCRIPTION OF THE DRAWINGS

Accordingly, it is one object of the present invention to provide an improved system for indicating the distance remaining to travel of a vehicle with respect to the amount of fuel remaining on board.

It is another object of the present invention to provide an improved distance to travel with respect to the remaining fuel on board signal for operating a vehicle, the signal being inhibited during the operations of the vehicle other than high gear operation.

It is a further object of the present invention to provide an improved system for indicating the fuel consumption of a vehicle for all operating parameters of the vehicle.

It is a further object of the present invention to provide an improved system for generating a fuel consumption per unit time signal and a vehicle speed signal for use in conjunction with a miles to go indicating system.

It is still another object of the present invention to provide an improved miles to go indicating system which is inexpensive to manufacture, easy to install and reliable in operation.

Further objects, features and advantages of the present invention will become apparent from a study of the specification and attached drawings in which:

FIG. 1 is a block diagram of a preferred form of the system of the present invention; and FIG. 2 is a schematic diagram illustrating the specific details of the fuel consumption circuit through the analog divider and buffer circuit of FIG. 1.

DETAILED DESCRIPTION OF A PREFERRED EMBODIMENT

Referring now to the drawings, particularly FIG. 1 thereof, there is illustrated a block diagram of a preferred embodiment of the system of the present invention which will be described in conjunction with a fuel injection, air/fuel ratio control system. In this type of system, the fuel consumption of the engine at any given instant of time is readily available by sampling the pulses utilized to actuate the fuel injectors. It is to be understood that the system of the present invention can be utilized with other types of fuel control systems which are electrically controlled and which adapt themselves to providing a fuel consumption signal. Also, if additional sensors are utilized, the system maybe used with a mechanically controlled air/fuel ratio system.

A system 10 is provided which includes the normal electronic control unit 12 utilized to provide injection pulses to the fuel injectors. The electronic control unit maybe any analog or digital control unit typically utilized to control the air/fuel ratio to an engine, as for example, U.S. Pat. No. 3,734,068 issued to J. N. Reddy on May 22, 1973. An electronic control unit for use with a single point fuel injection system is also described in Application Ser. No. 778,636, filed Mar. 17, 1977. The output of electronic control unit 12 is fed to a signal conditioner circuit 14 by means of a conductor 16, the signal conditioner being utilized to amplify the output signal of the electronic control unit and to integrate the pulses therefrom to provide a direct current signal representative of the fuel consumption of the engine. As will be seen from a description of FIG. 2, the signal conditioner cicuit 14 also includes an active filter circuit which is utilized to control the response of the system, to provide a relatively smooth operation of the output circuit, and control the gain of this leg of this system.

The vehicle speed is sensed by means of a vehicle speed sensor circuit 18 and an output signal is generated on a conductor 20 which is an analog representation of the vehicle speed or is a pulsed representation of the vehicle speed as might be derived from a tachometer vehicle speed generator. The output of the speed sensor circuit 18 is fed to a signal conditioner circuit 22 whereby the signal is amplified in the case of an analog output from the vehicle speed sensor circuit 18, or is integrated to provide a DC output signal representative of the vehicle speed in the case of a pulsed signal.

The output of the signal conditioner circuits 14, 22 is fed to an analog divider circuit 26 by means of conductors 28, 30 respectively, the analog divider circuit being utilized to divide the vehicle speed signal at conductor 30 by the fuel consumption signal at conductor 28. Thus, the distance traveled per unit time signal on conductor 30 is divided by the quantity of fuel per unit time signal on conductor 28 to result in a distance traveled per fuel consumption signal at the output of analog divider circuit 26. This output signal from analog divider circuit 26 on a conductor 32 would characteristically have the units of miles per gallon.

The signal on conductor 32 is fed to a multiplier circuit 36 through a buffer circuit 38 and a conductor 40. The multiplier circuit may be any circuit which is capable of multiplying one analog signal by another to produce a result which is the multiplication of two inputs.

As was stated above, the first input is the fuel consumption per distance traveled signal on conductor 40 and a second input is a quantity of fuel remaining on the vehicle signal fed to the multiplier circuit by means of a conductor 42. Typically, this latter signal might be characterized as a gallons to go signal and could be derived as an analog signal from the fuel remaining sensor normally provided on internal combustion engine vehicles.

Thus the multiplication of the distance traveled per quantity of fuel consumed signal on conductor 40 by a signal on conductor 42 which represents the quantity of fuel-to-go. This operation will result in a distance to go signal on an output conductor 44. This signal may be characterized as a miles-to-go signal and could be fed to an analog readout meter 46 or could be converted to a digital signal to provide a digital readout for the operator of the vehicle.

As briefly stated above, spurious output readings could be generated during acceleration, deceleration, or idle modes of operation of the vehicle. Accordingly, an inhibit switch is associated with the vehicle transmission to generate an enable signal on an input conductor 48 connected to the input of the multiplier circuit 36. When the vehicle is in high gear, an enabling signal is generated on conductor 48 to enable the circuit 36 to perform the multiplication function described above. When the vehicle is at any other mode of operation, park, neutral, low or intermediate gear operation, the operation of the multiplier circuit 36 is inhibited. As will be described in greater detail hereinafter, the analog divider circuit 26 could provide an output signal on conductor 40 which is representative of the distance traveled per fuel consumption of the vehicle.

Referring now to FIG. 2, it is illustrated the specific details of a major portion of the block diagram of FIG. 1 wherein the reference numerals from the blocks of FIG. 1 have been applied to the appropriate dotted blocks of FIG. 2. As stated above, the invention will be described in conjunction with a pulsed type of fuel injection system. However, it is to be understood that other types of systems for controlling the air/fuel ratio to an internal combustion engine may be utilized. Also, the operational amplifiers shown are input current responsive.

The aforementioned Reddy patent describes a system for supplying injector energization pulses to the fuel injectors of an internal combustion engine. As will be seen from a reading of the description of the Reddy patent, the frequency of injection pulses to the injectors is related to the engine speed and the duration of the injection pulses is related to the manifold absolute pressure of the engine. This is typically referred to as a speed/density type of control system. As will be readily apparent, the area within each pulse is representative of the amount of fuel being supplied to the engine for that particular pulse. If these pulses are integrated over a period of time, the resultant signal is a measure of the amount of fuel per unit time being supplied to the engine.

Accordingly, the input pulses, characterized as T.P. pulses, are fed to an input terminal 50 which is interconnected with the positive input of an operational amplifier circuit 52 through a resistor 54. The operational amplifier is utilized to invert the input pulses and control the input impedance of the circuit. The negative input to the operational amplifier 52 is connected to a positive source of direct current potential at terminal 56 through a resistor 58. The output of the operational amplifier 52 is fed to an operational amplifier 60, connected as an integrator, through a resistor 62. The integrator 60 is provided with the typical integrating capacitor 64 and the gain of the amplifier 60 is governed by the ratio between the resistor 62 and a resistor 66. Thus, the output of operational amplifier 60 is a rising and falling type of wave impressed on a DC level, the average of the undulating signal being representative of the fuel being supplied to the engine per unit time.

The output circuit of the signal conditioner 14 is an active filter circuit 68 which includes operational amplifier 70 having a positive input provided from the output of integrator 62 through a resistor 72, and the negative input of the operational amplifier is fed from the output of integrator 62 through a capacitor 74 and series resistor 76. Suitable feedback resistors 80,82 are provided for the operational amplifier 70, one of the resistors 80, 82 being a trim resistor. Further trimming of the operational amplifier 70 is provided by additional trim resistors 84, 86 connected from a positive source of direct current potential at terminal 90 to the negative and positive inputs of operational amplifier 70, respectively. Accordingly, any alternating current signal above approximately one hertz is canceled due to the fact that the signal is fed through to both inputs to the amplifier 70. The amplifier 70 also serves the function of controlling the response of the system and preventing sudden movements of the output meters.

The output of the operational amplifier 70 is a direct current analog signal representative of the fuel consumption per unit time of the engine at the particular operating conditions of the engine. This output signal is fed to the analog divider circuit 26 by means of a conductor 92.

Referring now to the vehicle speed signal generating portion of the system, it is seen that a speed sensor 100 generates an output signal in response to the vehicle speed, which vehicle speed may be sensed by a variety of well known circuits. The speed signal, if digital, is fed to an integrating capacitor 102 through a resistor 104 wherein the voltage level on the capacitor 102 is indicative of the average vehicle speed. This signal is fed to the positive input of an operational amplifier 106 connected as an amplifier. The operational amplifier is provided with the normal feedback resistors to provide the amplification factor, a resistor 108 being fixed and a resistor 110 being provided to trim the output signal. The output of operational amplifier 106 is fed to the analog divider circuit 26 by means of a conductor 114, and particularly to the positive input of an operational amplifier 116 through a resistor 118. A suitable trim resistor 120 is connected between the positive input of operational amplifier 116 and a positive source of direct current potential at terminal 22. The operational amplifier 116 is provided with a capacitor 124 connected between the output thereof and the negative input, the capacitor 124 being charged in accordance with the magnitude of the signal being fed to the positive input of the operational amplifier 116. In the absence of any other signals, the capacitor charge will represent the analog value of the vehicle speed.

The divider circuit also includes an oscillator 130 which provides a train of output pulses on output conductor 132, the frequency of which is determined by the external circuit parameters connected to a 555 chip 134. These circuit parameters are represented by resistors 136, 138, 140 and capacitor 144. The duty cycle is determined by the ratio of the effective resistance of resistors 138, 140 to the effective resistance of resistors 136, 138 and 140. The output pulses from the oscillator 130 are fed through a differentiator circuit 150 which includes a resistor 152 and a capacitor 154, the differentiator circuit providing positive and negative going spikes at the rising and falling edges of the output pulses from the oscillator 130. These spikes are fed to a transistor 158, the transistor being connected such that the positive going spikes are effective to render the transistor 158 conductive while the negative spikes merely back-bias the emitter-base junction of the transistor 158. Thus, the oscillator 130, differentiator circuit 150 and transistor 158 successively discharge capacitor 124. Thus when the transistor 158 is conductive, the capacitor 124 is grounded at the right terminal thereof, and the capacitor 124 will subsequently charge after the transistor 158 has ceased conduction. The rate at which the capacitor 124 will charge will be determined by the input signal to the positive terminal of operational amplifier 116. Thus, the signal waveform on conductor 160 will take the form of a sawtooth, the shape of which will be determined by the frequency of the oscillator 130 and the magnitude of the input signal on conductor 114.

As was described above, the signal level on conductor 92 is an analog voltage representative of the fuel consumption of the internal combustion engine. This signal is fed to the positive input of a comparator 162 through a resistor 164, the negative input being fed with the signal on conductor 160 through a resistor 166. Thus, the comparator 162 compares the relative voltages of the two inputs to the comparator 162 and will provide an output signal at conductor 170 which has a duty cycle representative of the division of the signal on conductor 114 by the signal on conductor 92 multiplied by a constant. This duty cycle is representative of the quantity of fuel being consumed and will increase as a function of fuel consumption per unit time and decrease as a function of vehicle speed.

The output of comparator 162 is fed to an integrator circuit 172, including an operational amplifier 174 connected as an integrator, the negative input to the amplifier 174 being interconnected with the output terminal by means of an integrating capacitor 176 and a resistor 178. Thus, the output of comparator 174, which appears on a conductor 180, will be an analog signal, the level of which represents distance traveled per fuel consumption. This signal is inverted and amplified by means of a transistor 182 and fed to the multiplier circuit described in conjunction with the description of FIG. 1 by means of a conductor 184. Also, the output of transistor 182 may be fed to a distance traveled per fuel consumption indicating meter 186 which would provide the operator of the vehicle with an indication of the fuel economy of the vehicle. Accordingly, the operator may adjust the operating parameters of the vehicle to achieve fuel economy.

While it will be apparent that the embodiments of the invention herein disclosed are well calculated to fulfill the objects of the invention, it will be appreciated that the invention is susceptible to modification, variation and change without departing form the proper scope or fair meaning of the subjoined claims.

What is claimed is:

1. A system for indicating the fuel comsumption for a vehicle relative to the operating conditions of the engine, the improvement comprising:

a fuel consumption sensing circuit for sensing the quantity of fuel being fed to the engine per unit of time and generating a fuel consumption signal in response thereto;

a speed sensing circuit for sensing the speed of the vehicle and generating a speed signal in response thereto including an integrating circuit and a speed signal hold circuit for holding said speed signal; and divider means connected to said fuel consumption sensing circuit and said speed sensing circuit for dividing said speed signal by said fuel comsumption signal and generating an instantaneous distance being traveled per quantity of fuel signal;

said divider means including a comparator circuit connected to said speed signal hold circuit and said fuel consumption sensing circuit, a speed signal eliminating circuit connected to said speed signal hold circuit for periodically eliminating said held speed signal, and an oscillator circuit connected to signal eliminating circuit for generating pulses, said pulses effective to cause said eliminating circuit to eliminate said held speed signal, said comparator circuit generating output pulses when said speed signal and said fuel consumption signal bear a preselected relationship, one to the other.

2. The system of claim 1 wherein the duty cycle of said comparator pulses indicates the ratio of distance traveled per fuel consumed.

3. The system of claim 2 wherein said hold circuit includes a capacitor for storing said speed signal, said oscillator being utilized to periodically discharge said capacitor.

4. The system of claim 3 further including an integration circuit connected to said comparator for integrating said comparator output pulses.

5. The improvement of claim 4 wherein said fuel injection system is a pulsed system and said integrator integrates the pulses being fed to the injectors.

* * * * *